United States Patent
Bai et al.

(10) Patent No.: US 9,349,390 B1
(45) Date of Patent: May 24, 2016

(54) ULTRA-SHORT YOKE LENGTH WRITER

(71) Applicant: Western Digital (Fremont), LLC, Fremont, CA (US)

(72) Inventors: Zhigang Bai, Fremont, CA (US); Ut Tran, San Jose, CA (US); Zhanjie Li, Pleasanton, CA (US); Kevin K. Lin, San Ramon, CA (US); Feng Liu, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/054,924

(22) Filed: Oct. 16, 2013

Related U.S. Application Data (60) Provisional application No. 61/865,569, filed on Aug. 13, 2013.

(51) Int. Cl.
  *G11B 5/17* (2006.01)
  *G11B 5/127* (2006.01)

(52) U.S. Cl.
  CPC ..................................... *G11B 5/127* (2013.01)

(58) Field of Classification Search
  CPC .............................. G11B 5/1278; G11B 5/127
  USPC ........................................ 360/123.01–123.61
  See application file for complete search history.

(56) References Cited

U.S. PATENT DOCUMENTS

| | | | |
|---|---|---|---|
| 6,894,877 B1 | 5/2005 | Crue, Jr. et al. | |
| 7,061,716 B2 | 6/2006 | Sasaki et al. | |
| 7,116,517 B1 | 10/2006 | He et al. | |
| 7,386,933 B1 | 6/2008 | Krounbi et al. | |
| 8,035,920 B2 | 10/2011 | Na et al. | |
| 8,035,921 B2 | 10/2011 | Sunwoo | |
| 8,218,264 B1 | 7/2012 | Sasaki et al. | |
| 8,310,787 B1 | 11/2012 | Sasaki et al. | |
| 8,315,014 B2 | 11/2012 | Lee et al. | |
| 8,345,382 B1 | 1/2013 | Sasaki et al. | |
| 8,358,487 B2 | 1/2013 | Sasaki et al. | |
| 2005/0007697 A1 | 1/2005 | Hsu et al. | |
| 2005/0128637 A1* | 6/2005 | Johnston et al. | 360/125 |
| 2005/0152064 A1* | 7/2005 | Bedell et al. | 360/126 |
| 2007/0230046 A1* | 10/2007 | Le et al. | 360/126 |
| 2008/0316631 A1* | 12/2008 | Gao et al. | 360/55 |
| 2012/0188666 A1 | 7/2012 | Sasaki et al. | |
| 2013/0057987 A1 | 3/2013 | Sasaki et al. | |

* cited by examiner

*Primary Examiner* — Gustavo Polo (57) ABSTRACT

A method and system provide a magnetic transducer having an air-bearing surface (ABS). The magnetic transducer includes a main pole having a pole tip, at least one auxiliary pole and at least one coil for energizing the main pole. The auxiliary pole(s) are adjacent to the main pole in a down track direction and recessed from the ABS. The coil(s) have a plurality of turns. At least one of the turns is between the auxiliary pole(s) and the ABS.

20 Claims, 7 Drawing Sheets

ULTRA-SHORT YOKE LENGTH WRITER

CROSS-REFERENCE TO RELATED APPLICATIONS

This application claims priority to provisional U.S. Patent Application Ser. No. 61/865,569, filed on Aug. 13, 2013, which is hereby incorporated by reference in its entirety.

BACKGROUND

Figure 1:
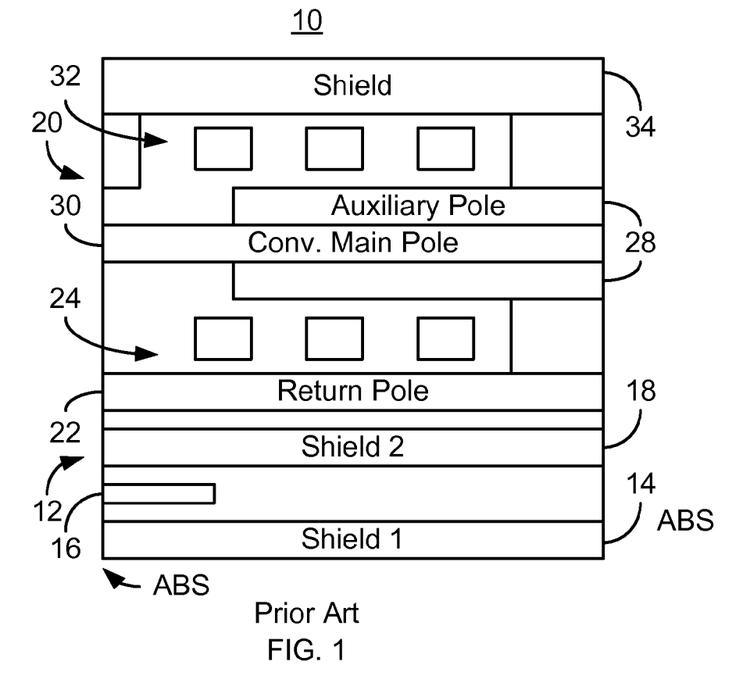
FIG. 1 depicts a side view of a conventional magnetic recording head.

FIG. 1 depicts a side view of a conventional magnetic recording head 10. The magnetic recording head 10 may be a perpendicular magnetic recording (PMR) head. The conventional magnetic recording head 10 includes a read transducer 12 and a write transducer 20. The conventional read transducer 12 includes shields 14 and 18 and sensor 16. The read sensor 16 is typically a giant magnetoresistive (GMR) sensor or tunneling magnetoresistive (TMR) sensor. The write transducer 20 includes a first, or return, pole 22, coils 24 and 32, back gap 26, auxiliary poles 28, main pole 30 and shield 34. Although not shown, the main pole 30 may have leading and/or trailing edge bevels. In such cases, the main pole 30 is shortest in the down track direction at the ABS.

Although the conventional magnetic recording head 10 functions, there are drawbacks. In particular, the conventional magnetic recording head 10 may not perform sufficiently at higher recording densities and higher recording speeds. For example, the main pole may not have sufficiently fast reversals in magnetic flux. The write field provided by the main pole 30 may also be desired to meet particular standards. Accordingly, what is needed is a system and method for improving the performance of a magnetic recording head.

DETAILED DESCRIPTION OF THE PREFERRED EMBODIMENTS

Figure 2:
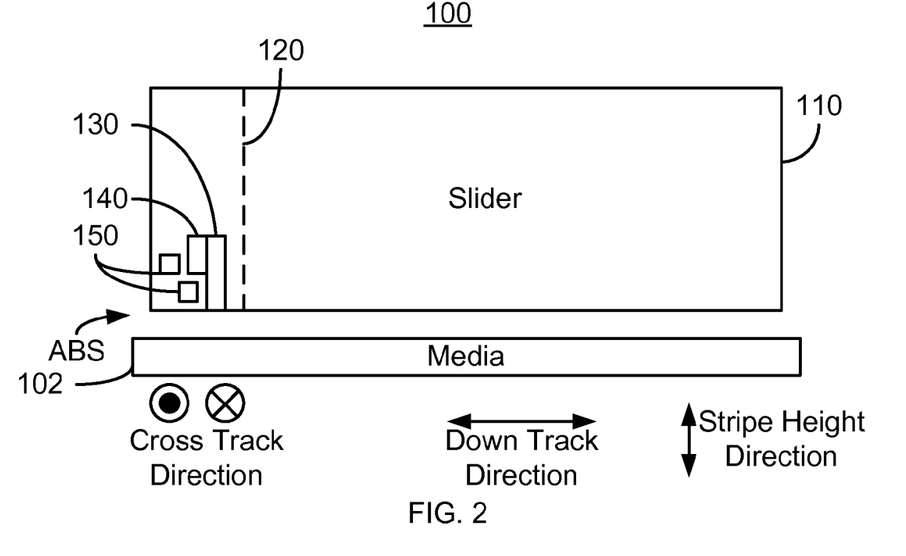
FIG. 2 depicts an exemplary embodiment of a magnetic recording disk drive.

FIG. 2 depicts a side view of an exemplary embodiment of a portion of a disk drive 100. For clarity, FIG. 2 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components 102, 110, 120 and 130 are shown. However, multiples of each components 102, 110, 120 and/or and their sub-components, might be used. The disk drive 100 may be a PMR disk drive. However, in other embodiments, the disk drive 100 may be configured for other types of magnetic recording.

The disk drive 100 includes media 102, a slider 110 and a write transducer 120. Additional and/or different components may be included in the disk drive 100. Although not shown, the slider 110 and thus the transducer 120 are generally attached to a suspension (not shown).

The transducer 120 is fabricated on the slider 110 and includes an air-bearing surface (ABS) proximate to the media 102 during use. In general, the disk drive 100 includes a write transducer 120 and a read transducer (not shown). However, for clarity, only the write transducer 120 is shown. The transducer 120 includes a main pole 130, an auxiliary pole 140 and coils 150. In other embodiments, different and/or additional components may be used in the write transducer 120.

The auxiliary pole 140 is adjacent to the main pole 130 in the down track direction. In the embodiment shown in FIG. 2, only one auxiliary pole 140 is shown. However, multiple auxiliary poles might be used. In addition, the auxiliary pole 140 is shown on one side of the main pole 130. In other embodiments, the auxiliary pole(s) may be on the other or both sides of the main pole 130. In addition, the auxiliary pole 140 is recessed from the ABS.

The coil(s) 150 shown includes two turns. Another number of turns may, however, be used. Note that only a portion of the coil(s) 150 are shown in FIG. 2. If, for example, the coil(s) 150 form a helical coil, then additional portion(s) of the coil(s) 150 may be located on the opposite side of the main pole 130 as the coil 150 shown. If the coil(s) 150 is a spiral, or pancake, coil, then additional portions of the coil(s) 150 may be located further from the ABS. Further, additional coils may also be used.

As can be seen in FIG. 2, at least one of the turns of the coil(s) 150 is located between the ABS and the auxiliary pole 140. Stated differently, the portion of the auxiliary pole closest to the ABS is still further from the ABS than at least one turn of the coil(s) 150. In the embodiment shown, the turn is actually located on a line drawn in the stripe height direction between the ABS and the portion of the auxiliary pole 140 closest to the ABS.

The magnetic disk drive 100 may exhibit improved performance. Because at least one turn of the coil(s) 150 is closer to the ABS than the auxiliary pole 140, the coil 150 may occupy less space in the stripe height direction. As a result, the yoke may be shorter. For example, in some embodiments, the yoke length for the main pole 130 may be not more than seven microns. In some such embodiments, the yoke length may be not more than 3.5 µm. The yoke may be not more than 3 µm. The yoke length may be at least 2.4 µm. The response time of the pole 130 may thus be improved. Data may be written at a higher rate. Further, the turn between the auxiliary pole 140 and the ABS may be closer to the main pole 130. As a result, a higher magnetic field may be generated in the main pole 130 for the same write current driven through the coil(s) 150. Thus, performance of the disk drive 100 may be improved.

Figure 3:
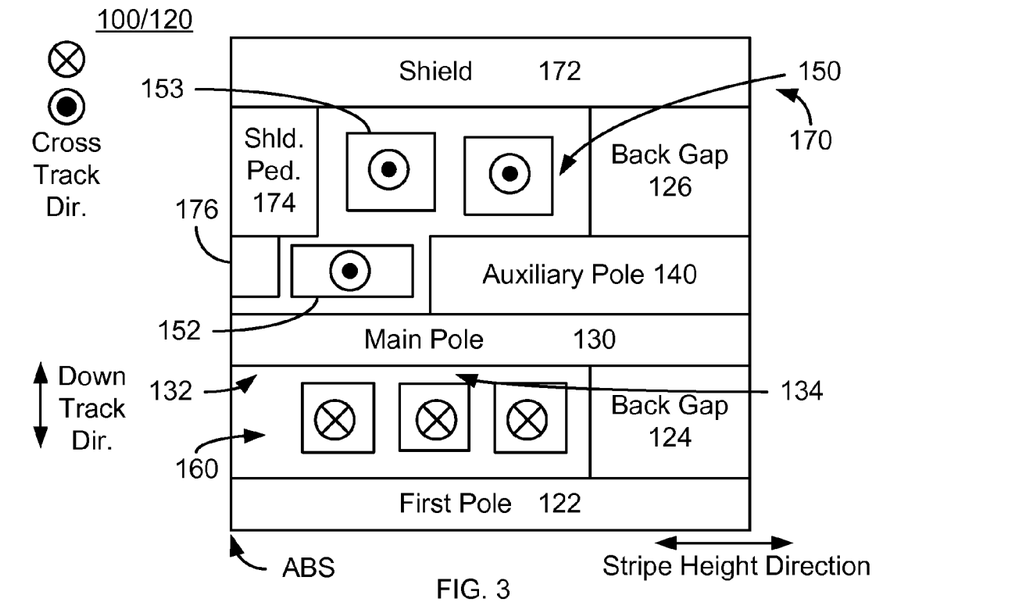
FIG. 3 depicts a side view of an exemplary embodiment of a magnetic recording transducer.

FIG. 3 depicts a side view of an exemplary embodiment of a magnetic disk drive 100. More specifically, a portion of the transducer 100 is depicted. For simplicity, only a portion of the magnetic recording transducer 120 is shown. For clarity, FIG. 3 is not to scale. The write transducer includes main pole 130, auxiliary pole 140 and coil 150 that are shown in FIG. 2. Referring to FIGS. 2-3, also shown are first or return pole 122, back gap 124 and 126 and shield 170. The main pole 130 is depicted as including a pole tip region 132 near the ABS and a yoke region 134 further from the ABS. In some embodiments, the pole tip region 132 may be beveled. In such embodiments, the surfaces adjoining the ABS do not form a right angle with the ABS. Thus, the pole tip region 132 would be thinnest closest to the ABS and widen in the stripe height direction. In alternate embodiments, component(s) may be omitted and/or configured differently. In some embodiments, for example, the back gap 124 may be omitted or configured such that the main pole 130 is not physically connected to the first pole 122.

The shield 170 includes a main shield region 172, a pedestal 174 and an additional shield region 176. Thus, a portion 176 of the shield 174 is close to the main pole 130. Portions 172, 174 and 176 of the shield have surfaces at the ABS. The main shield 170 is physically and magnetically connected to the back gap 176. However, in other embodiments, the shield 170 may be configured differently and have different and/or additional components.

The write transducer 120 is also shown as including two coils 150 and 160. In some embodiments, each coil 150 and 160 is a spiral coil having other turns distal from the ABS. However, in other embodiments, the coils 150 and 160 actually form a single helical coil. In both embodiments, it is desired to have current carried in opposite directions in the coils 150 and 160. Thus, FIG. 3 depicts the coil 150 carrying current out of the plane of the page while the coil 160 carries current into the plane of the page. The coil 150 might, however, carry current into of the plane of the page while the coil 160 carries current out of the plane of the page. However, in other embodiments, the coils 150 and 160 may be configured to carry current in other directions.

As can be seen in FIG. 3, each of the coils 150 and 160 has three turns. In other embodiments, one or both of the coils 150 and 160 may have a different number of turns. Consequently, the number of turns in the coils 150 and 160 may match or may be different. Further, the turn 152 of the coil 150 is between the auxiliary pole 140 and the ABS. Thus, the coil 150 and auxiliary pole 140 are configured in a manner similar to that which is shown in FIG. 2. In addition, the turn 152 is shown as having a different aspect ratio (width in the stripe height direction and height in the down track direction) than the remaining turns of the coil 150. However, in some embodiments, the cross sectional area of the turn 152 (width multiplied by height) is the same as for the remaining turns. In some embodiments, the coil 150 and/or the coil 160 is configured to have a total resistance of not more than ten ohms. In some such embodiments, the total resistance is at least two ohms and not more than seven ohms. However in other embodiments, other resistances are possible. In addition, the turns of the coils 150 and 160 are sufficiently spaced apart to be insulated from other structures, including other turns. For example, in some embodiments, the turn 152 is at least twenty nanometers and not more than four hundred nanometers from the auxiliary pole 140. Further, in the embodiment shown, the next turn 1543 overlaps the turn 152 in down track direction. Stated differently, a line drawn parallel to the down track direction may intersect both turns 152 and 153.

The magnetic transducer 120 depicted in FIGS. 2-3 may exhibit improved performance. Because the turn 152 of the coil 150 is closer to the ABS than the auxiliary pole 140, the coil 150 may occupy less space in the stripe height direction. As a result, the yoke region 134 of the main pole 130 may be shorter. For example, in some embodiments, the yoke 134 may be not more than 7 µm long. In some embodiments, the yoke 134 is not more than 5 µm long. In some such embodiments, the yoke 134 is not more than 3.5 µm long. The yoke may be not more than 3 µm. The yoke length may be at least 2.4 µm. The response time of the main pole 130 may thus be improved. Further, the turn 152 may be closer to the main pole 130. As a result, a higher magnetic field may be generated in the main pole 130 for the same write current driven through the coil 150. In addition, the coils 150 and 160 on opposite sides of the main pole 130 may carry current in opposite directions. The field in the main pole 130 from these currents is additive. Thus, a higher field may be generated. Consequently, performance of the magnetic transducer 120 and disk drive 100 may be improved.

Figure 4:
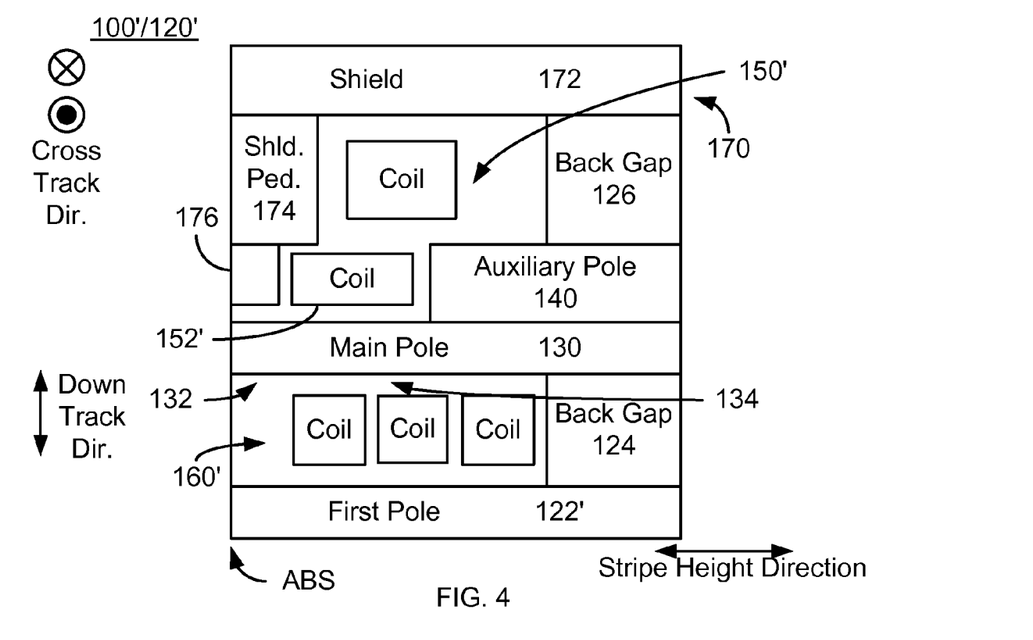
FIG. 4 depicts a side view of an exemplary embodiment of a magnetic recording transducer.

FIG. 4 depicts a side view of an exemplary embodiment of a magnetic disk drive 100'. More specifically, a portion of the transducer 100' is depicted. For simplicity, only a portion of the magnetic recording transducer 120' is shown. FIG. 4 is not to scale for clarity. The magnetic recording disk drive 100' is analogous to the magnetic disk drive 100. Consequently, analogous components have similar labels. The write transducer 120' thus includes a first pole 122, back gaps 124 and 126, main pole 130 having pole tip 132 and yoke 134 regions, auxiliary pole 140, shield 170 having portions 172, 174 and 176, coil 150' and coil 160' that are analogous to the first pole 122, back gaps 124 and 126, main pole 130 having pole tip 132 and yoke 134 regions, auxiliary pole 140, shield 170 having portions 172, 174 and 176, coil 150 and coil 160, respectively depicted in FIGS. 2-3. In alternate embodiments, component(s) may be omitted and/or configured differently. In some embodiments, for example, the back gap 124 may be omitted or configured such that the main pole 130 is not physically connected to the first pole 122.

The write transducer 120' is also shown as including two coils 150' and 160'. In the embodiment shown, the coil 160' has three turns. However, in other embodiments, the coil 160' may have another number of turns. For example, the coil 160' may have two turns. In some embodiments, each coil 150' and 160' is a spiral coil having other turns distal from the ABS. However, in other embodiments, the coils 150' and 160' actually form a single helical coil. In both embodiments, it is desired to have current carried in opposite directions in the coils 150' and 160'. However, in other embodiments, the coils 150' and 160' may be configured to carry current in other directions. The turn 152' is shown as having a different aspect ratio than the remaining turns of the coil 150'. However, in some embodiments, the cross sectional area of the turn 152' is the same as for the remaining turns. In some embodiments, the coil 150' and/or the coil 160' is configured to have a total resistance of not more than ten ohms. In some such embodiments, the total resistance is at least two ohms and not more than seven ohms. However in other embodiments, other resistances are possible. In addition, the turns of the coils 150' and 160' are sufficiently spaced apart to be insulated from other structures, including other turns. For example, in some embodiments, the turn 152' is at least twenty nanometers and not more than four hundred nanometers from the auxiliary pole 140.

As can be seen in FIG. 4, each of the coils 150' and 160' has two turns. Further, the turn 152' of the coil 150' is between the auxiliary pole 140 and the ABS. Thus, the coil 150' and auxiliary pole 140 are configured in a manner similar to that which is shown in FIG. 2.

The magnetic transducer 120' depicted in FIGS. 2 and 4 may exhibit improved performance. Because the turn 152' of the coil 150' is closer to the ABS than the auxiliary pole 140, the coil 150' may occupy less space in the stripe height direction. The yoke 134 may be further shortened by the use of fewer turns in the coils 150' and 160'. As a result, the yoke region 134' of the main pole 130 may be shorter. In some embodiments, the yoke 134 is not more than 5 µm long. In some such embodiments, the yoke 134' may be not more than 3.5 µm. In some embodiments, the yoke 134' may be not more than 3 µm. The yoke length may be at least 2.4 µm. The response time of the main pole 130 may thus be improved. Further, the turn 152' may be closer to the main pole 130. As a result, a higher magnetic field may be generated in the main pole 130. The coils 150' and 160' on opposite sides of the main pole 130 may carry current in opposite directions. Thus, a higher field may be generated. Consequently, performance of the magnetic transducer 120' and disk drive 100 may be improved.

Figure 5:
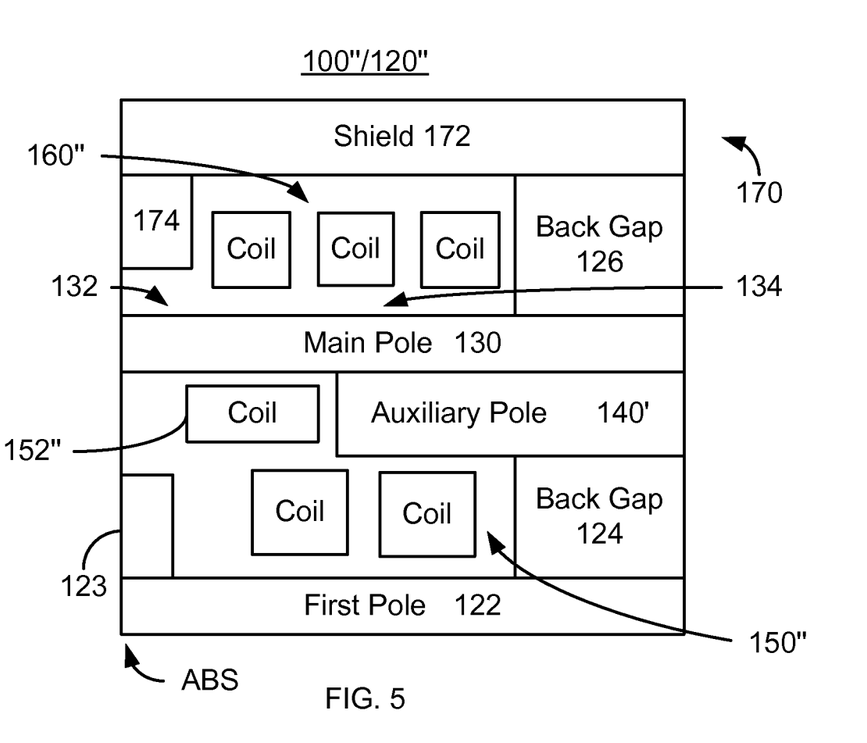
FIG. 5 depicts a side view of an exemplary embodiment of a magnetic recording transducer.

FIG. 5 depicts a side view of an exemplary embodiment of a magnetic disk drive 100". More specifically, a portion of the transducer 100" is depicted. For simplicity, only a portion of the magnetic recording transducer 120" is shown. FIG. 5 is not to scale for clarity. The magnetic recording disk drive 100" is analogous to the magnetic disk drive 100. Consequently, analogous components have similar labels. The write transducer 120" thus includes a first pole 122, back gaps 124 and 126, main pole 130 having pole tip 132 and yoke 134 regions, auxiliary pole 140', shield 170 having portions 172, 174 and 176, coil 150" and coil 160" that are analogous to the first pole 122, back gaps 124 and 126, main pole 130 having pole tip 132 and yoke 134 regions, auxiliary pole 140, shield 170 having portions 172, 174 and 176, coil 150 and coil 160, respectively depicted in FIGS. 2-3. In alternate embodiments, component(s) may be omitted and/or configured differently. In some embodiments, for example, the back gap 124 may be omitted or configured such that the main pole 130 is not physically connected to the first pole 122.

The write transducer 120" is also shown as including two coils 150" and 160" that are analogous to the coils 150 and 160. In other embodiments, one or both of the coils 150" and 160" may have a different number of turns. Consequently, the number of turns in the coils 150" and 160" may match or may be different. For example, in some embodiments, the coil 150" may include the three turns shown, while the coil 160" may include only two turns. In such an embodiment, the yoke 134 of the main pole 130 may be further shortened. In some embodiments, each coil 150" and 160" is a spiral, or pancake, coil having other turns distal from the ABS. However, in other embodiments, the coils 150" and 160" form a single helical coil. In both embodiments, it is desired to have current carried in opposite directions in the coils 150" and 160". However, in other embodiments, the coils 150" and 160" may be configured to carry current in other directions. The turn 152" is shown as having a different aspect ratio than the remaining turns of the coil 150". However, in some embodiments, the cross sectional area of the turn 152" is the same as for the remaining turns. In addition, the turns of the coils 150" and 160" are sufficiently spaced apart to be insulated from other structures, including other turns.

As can be seen in FIG. 5, the auxiliary pole 140' and coil 150" are still on the same side of the pole 130 in the down track direction. However, the auxiliary pole 140' and coil 150" are closer to the first pole 122 than to the shield 170. Thus, the coil 160" is closer to the shield 170 in the embodiment shown.

The magnetic transducer 120" depicted in FIGS. 2 and 5 may exhibit improved performance. Because the turn 152" of the coil 150" is closer to the ABS than the auxiliary pole 140, the coil 150" may occupy less space in the stripe height direction and the yoke 134 may be shortened. In some embodiments, the yoke 134 is not more than 5 µm long. In some embodiments, the yoke 134" may be not more than 3.5 µm. The yoke may be not more than 3 µm. The yoke length may be at least 2.4 µm. The response time of and data rate for the main pole 130 may thus be improved. Further, the turn 152" may be closer to the main pole 130, allowing a higher magnetic field to be generated in the main pole 130. The coils 150" and 160" on opposite sides of the main pole 130 may carry current in opposite directions, also increasing the write field. Consequently, performance of the magnetic transducer 120" and disk drive 100 may be improved.

Figure 6:
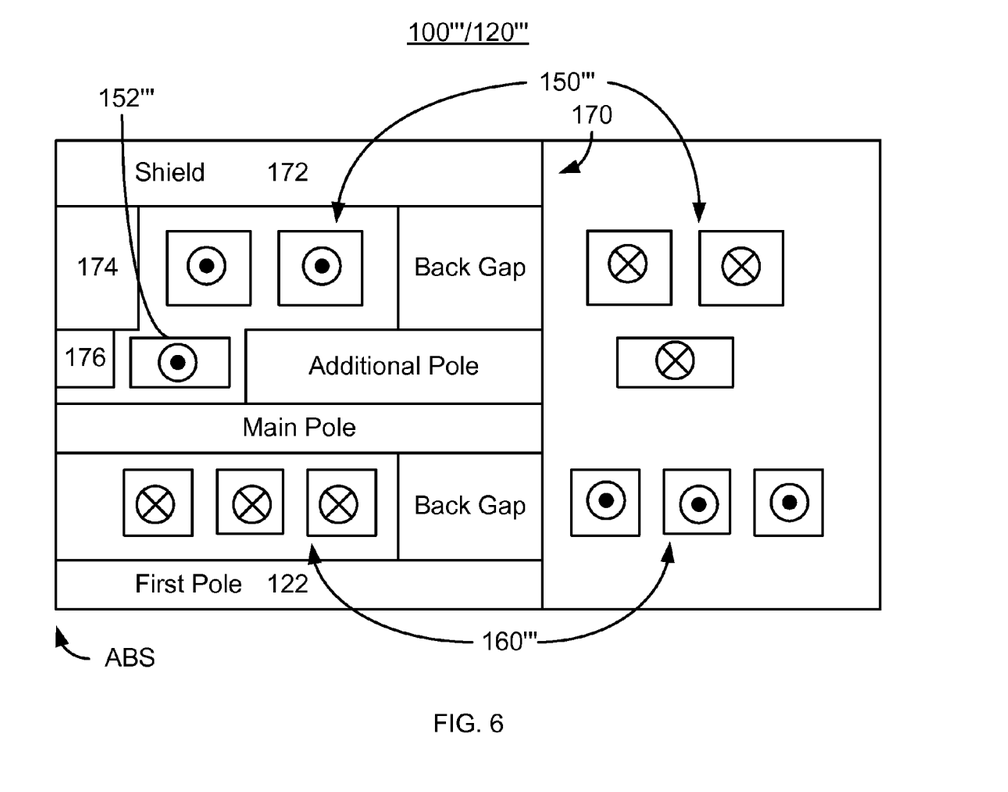
FIG. 6 depicts a side view of an exemplary embodiment of a magnetic recording transducer.

FIG. 6 depicts a side view of an exemplary embodiment of a magnetic disk drive 100'''. More specifically, a portion of the transducer 100''' is depicted. For simplicity, only a portion of the magnetic recording transducer 120''' is shown. FIG. 6 is not to scale for clarity. The magnetic recording disk drive 100''' is analogous to the magnetic disk drive 100. Consequently, analogous components have similar labels. The write transducer 120''' thus includes a first pole 122, back gaps 124 and 126, main pole 130 having pole tip 132 and yoke 134 regions, auxiliary pole 140, shield 170 having portions 172, 174 and 176, coil 150''' and coil 160''' that are analogous to the first pole 122, back gaps 124 and 126, main pole 130 having pole tip 132 and yoke 134 regions, auxiliary pole 140, shield 170 having portions 172, 174 and 176, coil 150 and coil 160, respectively depicted in FIGS. 2-3. In alternate embodiments, component(s) may be omitted and/or configured differently. In some embodiments, for example, the back gap 124 may be omitted or configured such that the main pole 130 is not physically connected to the first pole 122.

The write transducer 120''' is also shown as including two coils 150''' and 160''' that are analogous to the coils 150 and 160. In other embodiments, one or both of the coils 150''' and 160''' may have a different number of turns. Consequently, the number of turns in the coils 150''' and 160''' may match or may be different. In the embodiment shown, each coil 150''' and 160''' is explicitly depicted as a spiral coil having other turns distal from the ABS. The coil 150''' is shown as having turns on two levels distal from the ABS. However, in other embodiments, the turns for this portion of the coil 150''' may be on the same level. It is desired to have current carried in opposite directions in the coils 150''' and 160'''. However, in other embodiments, the coils 150''' and 160''' may be configured to carry current in other directions. The turn 152''' is shown as having a different aspect ratio than the remaining turns of the coil 150'''. However, in some embodiments, the cross sectional area of the turn 152''' is the same as for the remaining turns. In addition, the turns of the coils 150''' and 160''' are sufficiently spaced apart to be insulated from other structures, including other turns.

The magnetic transducer 120''' depicted in FIGS. 2 and 6 may exhibit improved performance for the reasons described above. Because the yoke 134 may be shortened, the main pole 130 may have a shorter response time and a higher data rate. The position of the turn 152''' and the configuration of the current carried in the coils 150''' and 160''' may also enhance the field generated in the main pole 130. Consequently, performance of the magnetic transducer 120''' and disk drive 100 may be improved.

Figure 7:
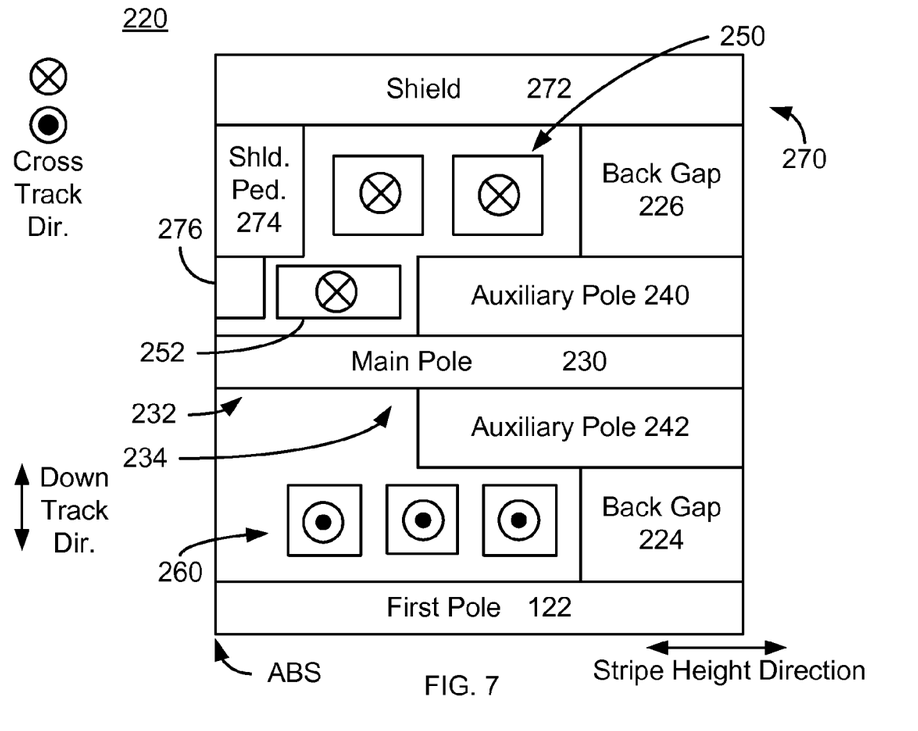
FIG. 7 depicts a side view of an exemplary embodiment of a magnetic recording transducer.

FIG. 7 depicts a side view of an exemplary embodiment of a magnetic transducer 220. For simplicity, only a portion of the magnetic recording transducer 220 is shown. FIG. 7 is not to scale for clarity. The magnetic recording transducer 220 is analogous to the transducers 120, 120', 120", and/or 120'''. Consequently, analogous components have similar labels. The write transducer 220 thus includes a first pole 222, back gaps 224 and 226, main pole 230 having pole tip 232 and yoke 234 regions, auxiliary pole 240, shield 270 having portions 272, 274 and 276, coil 250 and coil 260 that are analogous to the first pole 122, back gaps 124 and 126, main pole 130 having pole tip 132 and yoke 134 regions, auxiliary pole 140, shield 170 having portions 172, 174 and 176, coil 150/150'/

150"/150'" and coil 160/160'/160"/160"', respectively depicted in FIGS. 2-6. In the embodiment shown, the coils 250 and 260 have the same number of turns. In other embodiments, one or both of the coils 250 and 260 may have a different number of turns. Consequently, the number of turns in the coils 250 and 260 may match or may be different. For example, the coil 260 may have two turns, while the coil 250 may have the three turns shown. In such an embodiment the yoke 234 may be further shortened. In some embodiments, the location of the coils 250 and 260 may be switched. Thus, the coil 250 may be between the main pole 230 and the first pole 122, while the coil 260 may be between the main pole 230 and the shield 270. In such an embodiment, the turn 252 would be between the auxiliary pole 242 and the ABS instead of between the auxiliary pole 240 and the ABS. The configuration and operation of the components of the transducer 220 may be as described above for the transducers 120, 120', 120" and/or 120'". In alternate embodiments, component(s) may be omitted and/or configured differently. In some embodiments, for example, the back gap 224 may be omitted or configured such that the main pole 230 is not physically connected to the first pole 222.

In the embodiment shown, the magnetic transducer 220 includes multiple auxiliary poles. In addition to auxiliary pole 240, an additional auxiliary pole 242 is shown. Thus, the main pole 230 is between and, in the embodiment shown, adjoins (shares interfaces with) two auxiliary pole 240 and 242.

The magnetic transducer 220 depicted in FIG. 7 may exhibit improved performance for the reasons described above. Because of the configuration of the coil 250, the yoke 234 may be shortened. For example, in some embodiments, the yoke 134 is not more than 5 μm long. In some embodiments, the yoke 234 may be not more than 3.5 μm. Thus, the main pole 230 may have a shorter response time and a higher data rate. The position of the turn 252 and the configuration of the current carried in the coils 250 and 260 may also enhance the field generated in the main pole 230. Consequently, performance of the magnetic transducer 220 and disk drive 100 may be improved.

Figure 8:
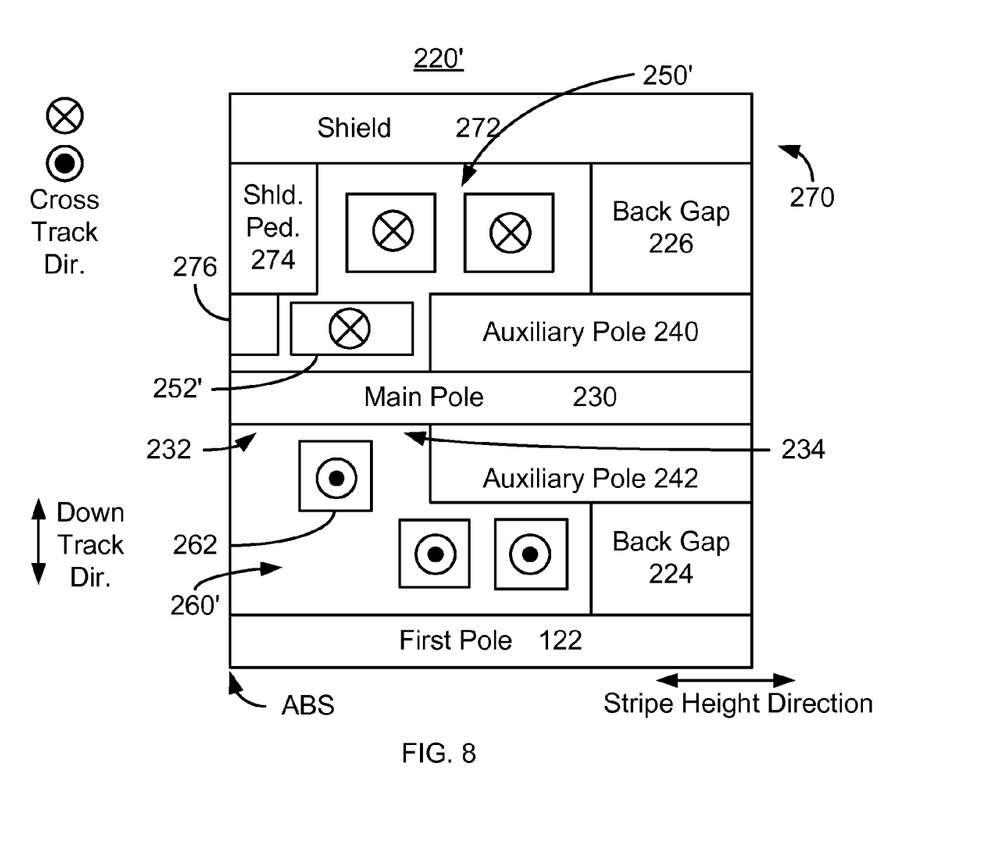
FIG. 8 depicts a side view of an exemplary embodiment of a magnetic recording transducer.

FIG. 8 depicts a side view of an exemplary embodiment of a magnetic transducer 220'. For simplicity, only a portion of the magnetic recording transducer 220' is shown. FIG. 8 is not to scale for clarity. The magnetic recording transducer 220' is analogous to the transducers 120, 120', 120", 120'" and/or 220. Consequently, analogous components have similar labels. The write transducer 220' thus includes a first pole 222, back gaps 224 and 226, main pole 230 having pole tip 232 and yoke 234 regions, auxiliary pole 240, shield 270 having portions 272, 274 and 276, coil 250' and coil 260' that are analogous to the first pole 122, back gaps 124 and 126, main pole 130 having pole tip 132 and yoke 134 regions, auxiliary pole 140, shield 170 having portions 172, 174 and 176, coil 150/150'/150"/150'"/250 and coil 160/160'/160"/160'"/260, respectively depicted in FIGS. 2-7. The configuration and operation of the components of the transducer 220' may be as described above for the transducers 120, 120', 120", 120'" and/or 220. In the embodiment shown, the coils 250' and 260' have the same number of turns. In other embodiments, one or both of the coils 250' and 260' may have a different number of turns. Consequently, the number of turns in the coils 250' and 260' may match or may be different. For example, the coil 250' may have three turns while the coil 260' has two turns, or vice versa. In such embodiments, the two turns may be on a single level or on two levels. For example, if the coil 250' includes only two turns, then the coil 250' may include the turn 252' and another turn. In other embodiments, the coil 250' may omit the turn 252'. Thus, the yoke 234' may be shortened. The coils 250' and 260' may each be a spiral, or pancake, coil having turns distal from the ABS. In other embodiments, the coils 250' and 260' may form a helical coil together. The magnetic transducer 220' also includes an additional auxiliary pole 242 that is analogous to the auxiliary pole 240. In alternate embodiments, component(s) may be omitted and/or configured differently. In some embodiments, for example, the back gap 224 may be omitted or configured such that the main pole 230 is not physically connected to the first pole 222.

In the magnetic transducer 220', the turn 262 of the coil 260' is analogous to the turn 252' of the coil 250. Thus, the turn 262 is between the auxiliary pole 242 and the ABS. In the embodiment shown, the aspect ratio of the turn 262 is substantially the same as the remaining turns of the coil 260'. However, in other embodiments, the turn 262 may be configured differently. For example, in some embodiments, the turn 262 may have an aspect ratio that is similar to that of the turn 252'.

The magnetic transducer 220' depicted in FIG. 8 may exhibit improved performance for the reasons described above. Because of the configuration of the coils 250' and 260', the yoke 234 may be shortened. For example, in some embodiments, the yoke 134 is not more than 5 μm long. In some such embodiments, the yoke 234 may be not more than 3.5 μm. The yoke may be not more than 3 μm. The yoke length may be at least 2.4 μm. Thus, the main pole 230 may have a shorter response time and a higher data rate. The position of the turns 252' and 262 and the configuration of the current carried in the coils 250' and 260' may also enhance the field generated in the main pole 230. Consequently, performance of the magnetic transducer 220' and disk drive 100 may be improved.

Figure 9:
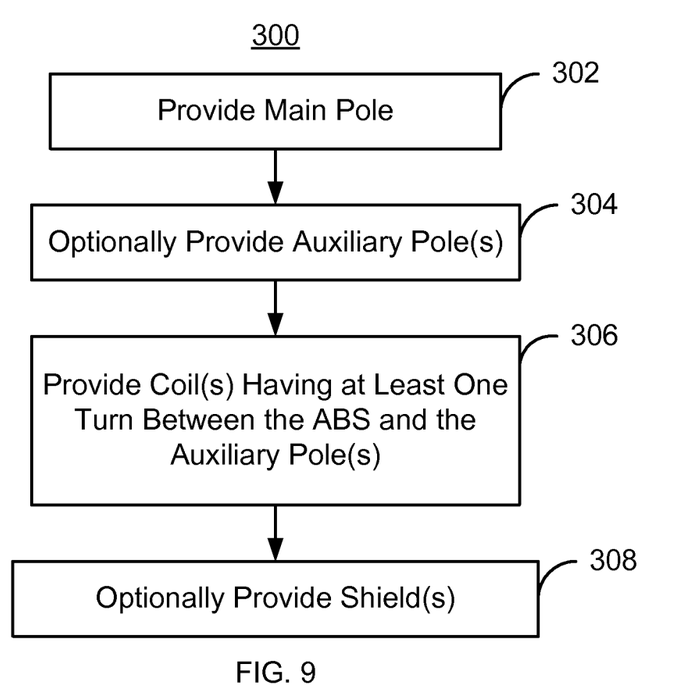
FIG. 9 is flow chart depicting an exemplary embodiment of a method for fabricating a magnetic recording head.

FIG. 9 depicts an exemplary embodiment of a method 300 for providing a magnetic recording transducer having a main pole that may have a shortened yoke length. For simplicity, some steps may be omitted, interleaved, and/or combined. The method 300 is also described in the context of providing a magnetic recording head 100 depicted in FIGS. 2-3. However, the method 300 may be used to fabricate multiple magnetic recording heads at substantially the same time. The method 300 may also be used to fabricate other magnetic recording transducers including but not limited to any combination of 120, 120', 120", 120'", 220 and/or 220'. The method 300 is also described in the context of particular layers. A particular layer may include multiple materials and/or multiple sub-layers. The method 300 also may start after formation of other portions of the magnetic recording head. For example, the method 300 may start after a read transducer, return pole/shield and/or other structure have been fabricated.

Referring to FIGS. 2, 3 and 9, the main pole 130 is provided, via step 302. Step 302 may include using a damascene process. For example, a trench may be formed in a layer and the material(s) for the pole 130 deposited and patterned. One or more ferromagnetic materials are deposited. The pole tip 132 and yoke 134 may be formed. Other methods may also be used to form the pole 130 including but not limited to full film deposition of magnetic materials and removal for example via milling and/or lapping.

The auxiliary pole(s) 140 may optionally be provided, via step 304. Portions of step 304 may thus be interleaved with other steps. For example, the auxiliary pole 140'/242 may be provided before the main pole 130. However, the auxiliary pole 140/240 may be provided after the main pole 130. In other embodiments, some of step 304 may be omitted. For example, the auxiliary pole 140', 240 or 242 may be omitted.

The coil(s) 150 and 160 are provided, via step 306. Portions of step 306 may thus be interleaved with the remaining steps of the method 300. For example, the coil 160 may be provided before the formation of the auxiliary pole 140 and the main pole 130. However, the coil 150 may be provided after some or all of these structures 130 and 140 have been formed. Step 306 may also include depositing and patterning the material(s) used for the coil(s) 150 and/or 160. Step 306 may include forming a single helical coil formed of the coils 150 and 160. Alternatively, one or two spiral coils may be formed using coils 150 and/or 160. In such embodiments, a spiral coil 150 and/or 160 may include other turns far from the ABS. The shield(s) 125 may also optionally be provided, via step 308.

Using the method 300, the magnetic disk drives 100, 100', 100", and/or 100''' and magnetic transducers 120, 120', 120", 120''', 220 and/or 220' may be provided. Thus, the benefits of the magnetic transducers 120, 120', 120", 120''', 220 and/or 220' may be achieved.

We claim:

1. A magnetic transducer having an air-bearing surface (ABS) comprising:
    a main pole including a pole tip;
    at least one auxiliary pole adjacent to the main pole in a down track direction and recessed from the ABS; and
    at least one coil for energizing the main pole and having a plurality of turns, at least one of the plurality of turns being between the at least one auxiliary pole and the ABS, the at least one of the plurality of turns being recessed from the ABS such that the ABS is free of structures having a current driven therethrough;
    wherein the plurality of turns includes at least one additional turn offset from the at least one of the plurality of turns in the down track direction; and
    wherein the at least one of the plurality of turns has a first cross-sectional area and the at least one additional turn has a second cross-sectional area substantially equal to the first cross-sectional area.

2. The magnetic transducer of claim 1 wherein the at least one of the plurality of turns is spaced apart from the at least one auxiliary pole by at least twenty nanometers and not more than four hundred nanometers.

3. The magnetic transducer of claim 2 wherein the plurality of turns has a resistance of not more than ten ohms.

4. The magnetic transducer of claim wherein the at least the additional turn overlaps the at least one of the plurality of turns in a stripe height direction perpendicular to the ABS.

5. The magnetic transducer of claim wherein the at least one of the plurality of turns includes a single turn.

6. The magnetic transducer of claim 5 wherein the plurality of turns includes three turns.

7. The magnetic transducer of claim 5 wherein the plurality of turns includes two turns.

8. The magnetic transducer of claim 1 further wherein the at least one coil is a portion of coil selected from a helical coil and a spiral coil.

9. The magnetic transducer of claim 1 wherein the main pole includes a first side and a second side opposite to the first side, wherein the plurality of turns is closer to the first side of the main pole and wherein at least one coil includes a second plurality of turns substantially equidistant from the main pole.

10. The magnetic transducer of claim 1 further comprising:
    a shield having a shield pedestal between the at least one of the plurality of turns and the ABS.

11. The magnetic transducer of claim 10 wherein the shield is on a first side of the main pole in the down track direction and the auxiliary pole is on a second side of the main pole, the second side of the main pole being opposite to the first side.

12. A magnetic transducer having an air-bearing surface (ABS) comprising:
    a main pole including a pole tip, a first side and a second side opposite to the first side in a down track direction;
    an auxiliary pole adjacent to the main pole in the down track direction and recessed from the ABS;
    a shield having a shield pedestal between the auxiliary pole and the ABS
    at least one coil for energizing the main pole and having a plurality of turns, a first turn of the plurality of turns being between the auxiliary pole and the shield pedestal, at least one additional turn of the plurality of turns being offset from the first turn in the down track direction, the at least one coil forming at least one of a helical coil and a spiral coil, the first turn being recessed from the ABS such that the ABS is free of structures having a current driven therethrough;
    wherein the plurality of turns includes at least one additional turn offset from the at least one of the plurality of turns in the down track direction; and
    wherein the at least one of the plurality of turns has a first cross-sectional area and the at least one additional turn has a second cross-sectional area substantially equal to the first cross-sectional area.

13. A disk drive comprising:
    a medium,
    a slider, and
    a magnetic transducer coupled with the slider, the magnetic transducer having an air-bearing surface (ABS), a main pole, at least one auxiliary pole and at least one coil for energizing the main pole, the main pole including a pole tip, the at least one auxiliary pole adjacent to the main pole in a down track direction and recessed from the ABS, and the at least one coil having a plurality of turns, at least one of the plurality of turns being between the at least one auxiliary pole and the ABS, the at least one of the plurality of turns being recessed from the ABS such that the ABS is free of structures having a current driven therethrough;
    wherein the plurality of turns includes at least one additional turn offset from the at least one of the plurality of turns in the down track direction; and
    wherein the at least one of the plurality of turns has a first cross-sectional area and the at least one additional turn has a second cross-sectional area substantially equal to the first cross-sectional area.

14. A method for providing a magnetic transducer having an air-bearing surface (ABS) comprising:
    providing a main pole including a pole tip;
    providing at least one auxiliary pole adjacent to the main pole in a down track direction and recessed from the ABS; and
    providing at least one coil for energizing the main pole and having a plurality of turns, at least one of the plurality of turns being between the at least one auxiliary pole and the ABS, the at least one of the plurality of turns being recessed from the ABS such that the ABS is free of structures having a current driven therethrough;
    wherein the plurality of turns includes at least one additional turn offset from the at least one of the plurality of turns in the down track direction; and
    wherein the at least one of the plurality of turns has a first cross-sectional area and the at least one additional turn has a second cross-sectional area substantially equal to the first cross-sectional area.

15. The method of claim 14 wherein the at least one additional turn overlaps the at least one of the plurality of turns in a stripe height direction perpendicular to the ABS.

16. The method of claim 14 wherein the at least one of the plurality of turns includes a single turn.

17. The method of claim 14 wherein the plurality of turns includes three turns.

18. The method of claim 14 wherein the plurality of turns includes two turns.

19. The method of claim 14 further wherein the at least one coil is part of a coil selected from a helical coil and a spiral coil.

20. The method of claim 14 further comprising:
provideing a shield having a shield pedestal between the at least one turn of the plurality of turns and the ABS.

* * * * *